(12) United States Patent
Lee et al.

(10) Patent No.: US 7,948,174 B2
(45) Date of Patent: May 24, 2011

(54) PANEL FOR MULTI-PANEL DISPLAY AND METHOD OF MANUFACTURE

(75) Inventors: Young-gu Lee, Suwin-si (KR);
Young-tea Chun, Suwon-si (KR);
In-seo Kee, Seongnam-si (KR);
Hong-shik Shim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 963 days.

(21) Appl. No.: 11/501,579

(22) Filed: Aug. 9, 2006

(65) Prior Publication Data
US 2007/0229392 A1    Oct. 4, 2007

(30) Foreign Application Priority Data

Mar. 28, 2006   (KR) .................. 10-2006-0028030

(51) Int. Cl.
*H01J 1/62*    (2006.01)

(52) U.S. Cl. .......................................... 313/512; 445/24

(58) Field of Classification Search .................. 313/512; 445/25, 43
See application file for complete search history.

(56) References Cited

U.S. PATENT DOCUMENTS

| | | | |
|---|---|---|---|
| 2004/0046494 A1* | 3/2004 | Lai | 313/504 |
| 2004/0201347 A1* | 10/2004 | Park et al. | 313/512 |
| 2005/0116636 A1* | 6/2005 | Kang | 313/512 |

* cited by examiner

*Primary Examiner* — Joseph L Williams
*Assistant Examiner* — Zachary Snyder
(74) *Attorney, Agent, or Firm* — Cantor Colburn LLP

(57) ABSTRACT

A panel for a multi-panel display effectively reduces the width of its connecting portion. The panel for a multi-panel display comprises a substrate, a display element mounted on the substrate, a glass cover attached to the substrate, and a recess in the substrate between the display element and an end of the substrate, wherein the glass cover is attached to the substrate within the recess. The panel for a multi-panel display of the present invention reduces the width of the connecting portion so that a high quality continuous screen image formed on two panels can be obtained.

14 Claims, 3 Drawing Sheets

PANEL FOR MULTI-PANEL DISPLAY AND METHOD OF MANUFACTURE

This application claims priority to Korean Patent Application No. 10-2006-0028030, filed on Mar. 28, 2006, and all the benefits accruing therefrom under 35 U.S.C. §119, the contents of which in its entirety are herein incorporated by reference.

BACKGROUND OF THE INVENTION

1. Field of the Invention

The present invention relates to a panel for a multi-panel display, and more particularly, to a panel for a multi-panel display, which effectively reduces the width of a connecting portion between two panels of the multi-panel display.

2. Description of the Related Art

A multi-panel display device forms a large screen image by connecting a plurality of display panels together. In the pasty, cathode-ray tubes ("CRT") such as television sets were used, but more recently flat display panels such as a liquid crystal display ("LCD"), a field emission display ("FED"), a plasma display panel ("PDP") and an organic light emitting diode ("OLED") have been used to provide large screens for cellular phones and personal digital assistants ("PDAs").

As shown in FIG. 1, the multi-panel display device is formed by connecting two unit panels 10 together, using either an adhesive or hinges. The hinge connecting method is explained below.

When the width w of the connecting portion between the unit panels 10 is too wide, the image is interrupted. As shown in FIG. 1, a flat display panel has a sealing structure in which a display element 12 is mounted on a substrate 11 and a glass cover 13 is attached to the substrate 11 by an adhesive 14. The edge thickness t of the glass cover 13 is about 1 mm, and the width w of the connecting portion will be at least 2 mm when two panels are connected together.

Conventionally, when the connecting portion has a width w less than 0.5 mm, the image appears continuous, whereas when the connecting portion has a width w that is more than 1.0 mm, the image is interrupted. Therefore the image quality of the multi-panel display device depends on the width w of the connecting portion.

Arbitrarily reducing the width of the edge of the glass cover 13 has a detrimental effect on the display device 12 (e.g., the pixel), because manufacturing tolerances cannot prevent gaps which allow moisture to enter. Furthermore, the adhesive 14 can be pushed onto the display element 12 when attaching the glass cover 13 to the substrate 11.

Therefore, a new panel for a multi-panel display is desired that resolves the problems of the connecting portion and provides a continuous image.

BRIEF SUMMARY OF THE INVENTION

The present invention provides a panel for a multi-panel display which reduces the width of a connecting portion to provide a continuous image and prevents the penetration of moisture or adhesive.

The panel for a multi-panel display comprises a substrate, a display element mounted on the substrate, a glass cover attached to the substrate, and a recess in the substrate between the display elements, wherein the glass cover is attached to the substrate within the recess.

The panel of the present invention further comprises a passivation layer covering the display element.

The passivation layer may be made of $Al_2O_3$, $SiO_2$, poly vinyl acetate (PVA), photo acryl (PA) or polyimide (PI).

The panel of the present invention further comprises a partitioning wall in the recess inside the glass cover.

The display element may be a liquid crystal display ("LCD"), a field emission display ("FED"), a plasma display panel ("PDP") or an organic light emitting diode ("OLED").

A multi-panel display image is formed by connecting panels, and the width of the connecting portion may be less than about 0.3 mm.

A method of manufacturing a panel for multi-panel display is also disclosed. The method includes mounting a display element on a substrate, attaching a glass cover to the substrate, and positioning a recess in the substrate between the display element and an end of the substrate. The glass cover is attached on the substrate within the recess.

BRIEF DESCRIPTION OF THE DRAWINGS

The above and other aspects, features and advantages of the present invention will become more apparent by describing exemplary embodiments thereof with reference to the attached drawings in which.

DETAILED DESCRIPTION OF THE INVENTION

Figure 1:
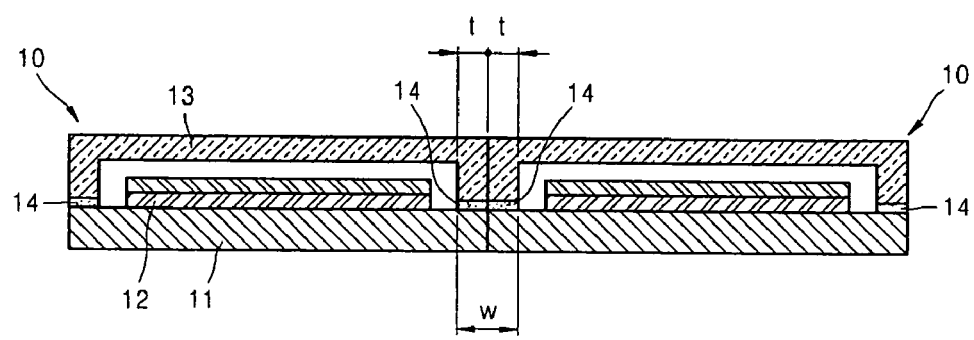
FIG. 1 is a cross-sectional view of a conventional panel for a multi-panel display.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2A:
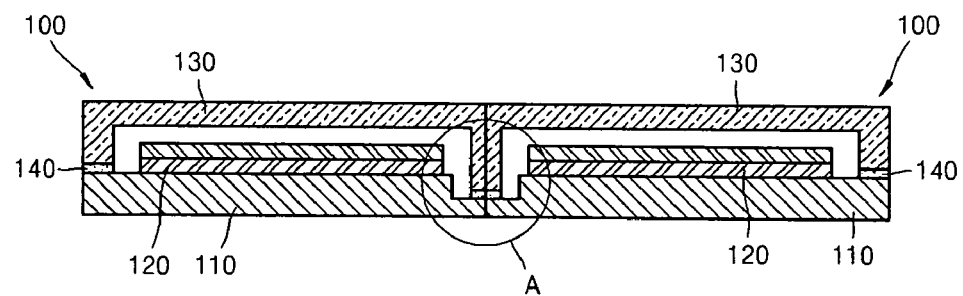
FIG. 2A is a cross-sectional view of an exemplary embodiment of a panel for a multi-panel display according to the present invention.
Figure 2B:
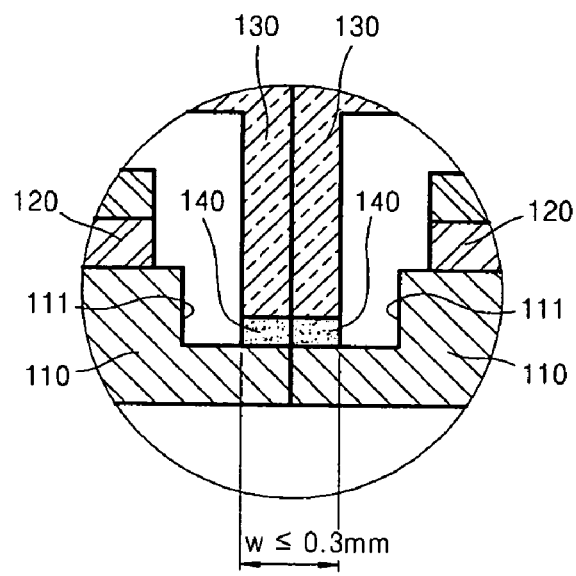
FIG. 2B is an enlarged view of portion A of FIG. 2A.

FIGS. 2A and 2B are cross-sectional views of an exemplary embodiment of a panel 100 for a multi-panel display according to the present invention. The multi-panel display device may be formed by connecting a plurality of panels by various methods, but for ease of explanation only two unit panels 100 are shown, connected with a hinge. The display element 120 for image display is illustrated schematically.

First, each display element 120 is deposited on a substrate 110 and a glass cover 130 is attached on the substrate 110 by an adhesive 140 to cover the display element 120. If the device is a top emission type, the screen image produced by the display element 120 is displayed through the glass cover 130, whereas if the device is a bottom emission type, the screen image is displayed through the substrate 110.

Two unit panels 100 are connected by a hinge to form a multi-panel display. The width w of the connecting portion is less than about 0.3 mm as shown in FIG. 2B. This width provides a continuous screen image formed of two units. Of course, arbitrarily reducing the width of the connecting portion increases the risk of producing a bad display device 120 (e.g., pixel) by allowing the penetration of moisture or adhesive, but the present invention eliminates this risk by forming a recess 111 (FIG. 2B) where the glass cover 130 meets the substrate 110. As shown in FIG. 2B, the recess 111 is formed in the substrate 110 between two display elements 120 so that the edge of the glass cover 130 is attached to the recess 111 of the substrate 110 by the adhesive 140. Thus, the passage from the recess 111 to the display element 120 is not direct or straight and moisture from the outside cannot reach the display element 120. Also, even if the adhesive 140 is pushed towards the display element 120 in attaching process, the adhesive 140 is blocked by the recess 111 and cannot reach the display element 120. Therefore, even if the width w is reduced, the structure of the recess 111 prevents degradation of the element 120 due to the penetration of the moisture or adhesive. Furthermore, since the connecting portion is less than 3 mm wide, a multi-panel display having an uninterrupted screen image can be obtained.

Figure 3:
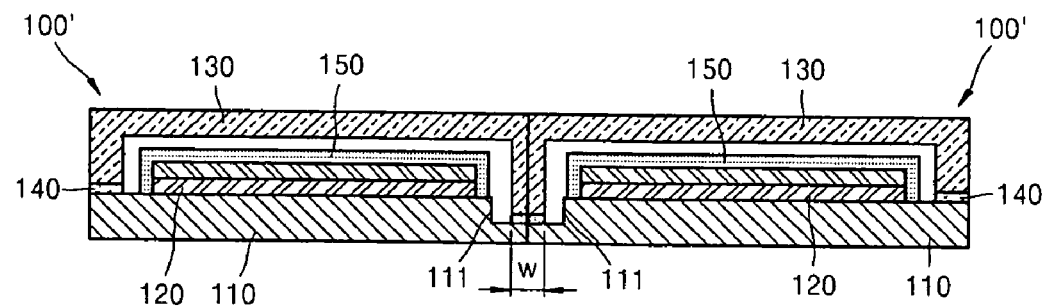
FIG. 3 is a cross-sectional view of an another exemplary embodiment of a panel for a multi-panel display according to the present invention.

FIG. 3 is a cross-sectional view of another exemplary embodiment of a panel 100' for a multi-panel display according to the present invention. Like reference numerals denote like elements in the drawings.

A passivation layer 150 covers the display element 120 to protect it. The combination of the glass cover 130 and the recess 111 of the substrate 110 prevents the penetration of moisture or adhesive. Also, the display element 120 is covered by the passivation layer 150 to increase stability of operation of the display element 120. Thus, the width w of the connecting portion can be reduced to about 0.3 mm. The material of the passivation layer 150 can be $Al_2O_3$, $SiO_2$, poly vinyl acetate (PVA), photo acryl (PA), polyimide (PI), etc.

Figure 4:
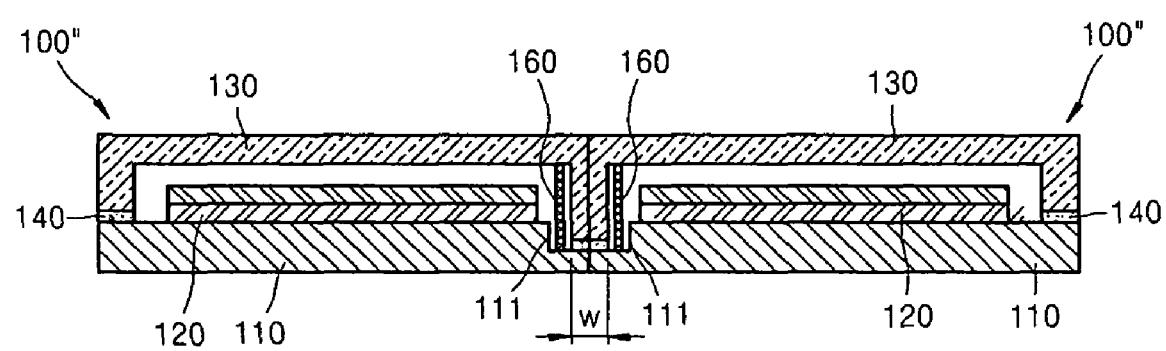
FIG. 4 is a cross-sectional view of yet another exemplary embodiment of a panel for a multi-panel display according to the present invention.

FIG. 4 is a cross-sectional view of yet another exemplary embodiment of a panel 100" for a multi-panel display according to the present invention.

In this exemplary embodiment, the combination of the glass cover 130 and the recess 111 of the substrate 110 prevents the penetration of moisture or adhesive. Also, a partitioning wall 160 is provided inside the glass cover 130 in the recess 111 to increase resistance to moisture and adhesive. Thus, the width w of the connecting portion can be reduced to about 0.3 mm.

The display element 120 may be a flat display element such as a liquid crystal display ("LCD"), a field emission display ("FED"), a plasma display panel ("PDP"), or an organic light emitting diode ("OLED").

The panel for a multi-panel display of the present invention reduces the width of the connecting portion between adjoining panels so that a high quality continuous screen image formed on the two panels can be obtained.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A panel for multi-panel display comprising:
   a substrate;
   a plurality of display elements mounted on the substrate;

a glass cover attached to the substrate to cover the display elements; and a recess formed in the substrate between neighboring display elements of the plurality of display elements where the glass cover protrudes into the recess and is attached to the substrate within the recess; and where each display element lies between the protrusion into the recess and the edge of the glass cover.

2. The panel of claim 1, further comprising a passivation layer covering the display element.

3. The panel of claim 2, wherein the passivation layer is made of $Al_1O_3$, $SiO_2$, poly vinyl acetate (PVA), photo acryl (PA) or polyimide (PI).

4. The panel of claim 1, further comprising a partitioning wall in the recess inside the glass cover.

5. The panel of claim 4, wherein the partitioning wall extends from the recess along a sidewall of the glass cover attached on the substrate.

6. The panel of claim 1, wherein the display element is a liquid crystal display (LCD), field emission display (FED), plasma display panel (PDP) or organic light emitting diode (OLED).

7. The panel of claim 1, wherein a multi-panel display image is formed by connecting two panels each having the end of the substrate in which the recess is formed and the combined panels define a width of a connecting portion less than about 0.3 mm corresponding to a width of a portion of each glass cover attached on the respective substrate.

8. A method of manufacturing a panel for multi-panel display, the method comprising:

mounting a plurality of display elements on a substrate;

disposing a glass cover on the substrate to cover the plurality of display elements;

positioning a recess in the substrate between neighboring display elements of the plurality of display elements; wherein the glass cover protrudes into the recess and is attached to the substrate within the recess; and where each display element lies between the protrusion into the recess and the edge of the glass cover.

9. The method of claim 8, further comprising covering the display element with a passivation layer.

10. The method of claim 9, further comprising making the passivation layer of $Al_2O_3$, $SiO_2$, poly vinyl acetate (PVA), photo acryl (PA) or polyimide (PI).

11. The method of claim 8, further comprising forming a partitioning wall in the recess inside the glass cover.

12. The method of claim 11, further comprising forming the partitioning wall to extend from the recess along a sidewall of the glass cover attached on the substrate.

13. The method of claim 8, wherein the display element is a liquid crystal display (LCD), field emission display (FED), plasma display panel (PDP) or organic light emitting diode (OLED).

14. The method of claim 8, further comprising forming a multi-panel display image by connecting two panels each having the end of the substrate in which the recess is formed and the combined panels define a width of a connecting portion less than about 0.3 mm corresponding to a width of a portion of each glass cover attached on the respective substrate.

* * * * *